US007920315B2

(12) United States Patent
Perasso et al.

(10) Patent No.: US 7,920,315 B2
(45) Date of Patent: Apr. 5, 2011

(54) POLARIZATION-CONTROLLER DRIVING METHOD FOR OPTICAL FIBER TRANSMISSION SYSTEMS AND APPARATUS IN ACCORDANCE WITH SAID METHOD

(75) Inventors: Aldo Perasso, Genoa (IT); Massimo Speciale, Genoa (IT)

(73) Assignee: Ericsson AB, Stockholm (SE)

( * ) Notice: Subject to any disclaimer, the term of this patent is extended or adjusted under 35 U.S.C. 154(b) by 406 days.

(21) Appl. No.: 11/814,978

(22) PCT Filed: Dec. 14, 2005

(86) PCT No.: PCT/EP2005/056777
§ 371 (c)(1),
(2), (4) Date: Dec. 23, 2008

(87) PCT Pub. No.: WO2006/079437
PCT Pub. Date: Aug. 3, 2006

(65) Prior Publication Data
US 2009/0296186 A1    Dec. 3, 2009

(30) Foreign Application Priority Data

Jan. 27, 2005   (IT) .............................. MI2005A0112

(51) Int. Cl.
*G02B 26/00* (2006.01)
(52) U.S. Cl. .................... 359/239; 359/498; 359/484
(58) Field of Classification Search .............. 359/239, 359/498, 484
See application file for complete search history.

(56) References Cited

U.S. PATENT DOCUMENTS

2003/0174400 A1    9/2003  Patel et al.
2004/0131363 A1*   7/2004  Kisaka et al. ............ 398/152

FOREIGN PATENT DOCUMENTS

EP           0393967        10/1990

OTHER PUBLICATIONS

Gunkel, Matthias. "Reset-free Endless Polarisation Control with Finite Range Devices." Proceedings of the SPIE—The International Society for Optical Engineering USA, 1995, vol. 2449, pp. 184-192.

* cited by examiner

*Primary Examiner* — Ricky L Mack
*Assistant Examiner* — James C Jones
(74) *Attorney, Agent, or Firm* — Coats & Bennett P.L.L.C.

(57) ABSTRACT

A method of piloting an optical polarization controller including a cascade of variable polarization transformers that can be driven individually to realize overall a polarization transformation between an input optical signal and an output optical signal with each transformer having predetermined maximum and minimum end driving limits. For each transformer the method includes cyclically the steps of finding an error signal output to the controller and driving a first transformer polarization variation by a predetermined amount CS in one of the two directions to check whether with this variation the error signal is reduced and, if not, driving in the opposite direction. The decision of which of the two directions to drive first is made each time and is not fixed. Equipment in accordance with the method is also described.

17 Claims, 2 Drawing Sheets

Figure 1:
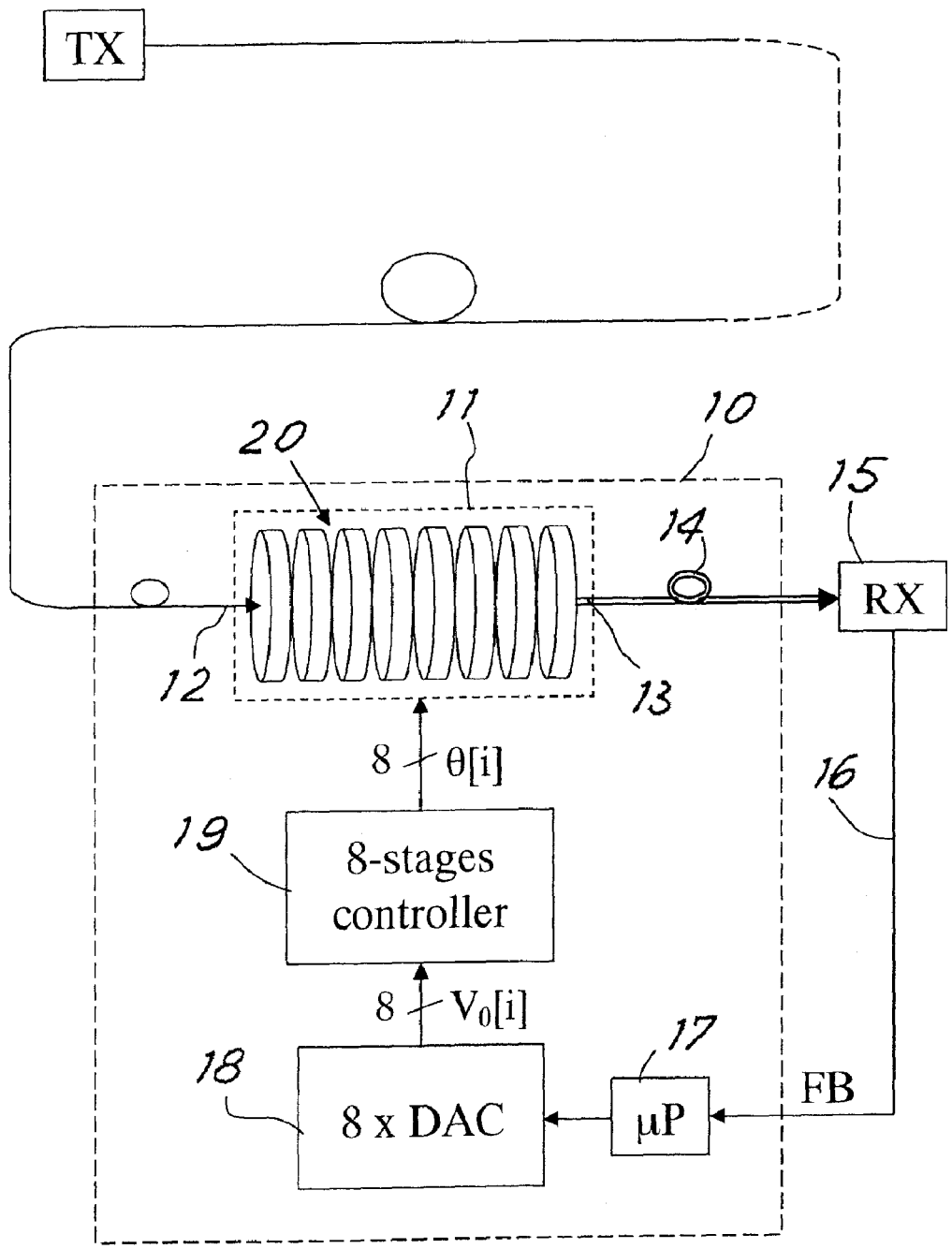

POLARIZATION-CONTROLLER DRIVING METHOD FOR OPTICAL FIBER TRANSMISSION SYSTEMS AND APPARATUS IN ACCORDANCE WITH SAID METHOD

This invention relates to a method for driving a polarization controller (PC) using a piloting criterion allowing minimization of the probability of a reset condition and maximization of the response speed of the PC for optical-fiber transmission systems.

By reset condition is meant the fact that in normal operation a PC can meet a particular working condition in which the time-varying input polarization state cannot be transformed endlessly into the desired output polarization state without an undesired abrupt variation in output polarization. Reset condition implies penalization of the final user, for example, an optical receiver.

A reset-free PC is also designated an 'endless tracking device'.

Possible applications are in high-capacity optical digital transmissions at 10 Gb/s and very high bit-rates where some impairment of the signal related to polarization such as Polarization Mode Dispersion (PMD) becomes critical. In particular, direct application of this invention could be in an adaptive optical equalizer called PMD compensator. In any case, the idea can be used in other fields like heterodyne receivers and future applications that can require endless tracking of the input polarization optical state.

A PC can be conceived as a cascade of a certain number of variable polarization transformers (PT) that can be driven (or rotated) individually to realize a polarization transformation between an input optical signal and an output optical signal.

Independently of their realization technology, for the sake of simplicity reference will be made here generally to a phase-shifting type PT that can be driven electrically between a minimum rotation figure and a maximum rotation figure (0° and 360° respectively). These extreme limits are known as PT saturation figures.

It is known in the prior art that with a suitable PC made up of only three PTs it is possible to transform any input polarization state into any output polarization state. But if endless behavior is required, that is to say no abrupt variation in the output-signal polarization for all the possible small polarization variations in the incoming signal, many studies have shown that at least six PTs are required for a PC with endless tracking.

An extremely simplified explanation of this requirement is that in normal operation if the first group of 3 PTs should reach one of its extreme limits (all PTs have reached their saturation figure of 0° or 360°) the second group of 3 PTs should be able to track the desired output polarization state while the first three PTs would be gradually 'unwound' and reset in their typical control interval far from their saturation limits of 0° or 360°.

A deterministic algorithm ensures endless behavior of the total PC with a direct but cumbersome implementation of the above-mentioned strategy.

Let us assume that a PC is used for endless tracking of a predetermined polarization state at its output port when an input polarization state varying randomly in time is at its input port.

A potential criticality in the common practice is that a deterministic algorithm will in some way force the state of the PC with an unwinding procedure on one of its PTs to deviate from the normal operation of the device. This makes the PC less efficient to meet rapid variations in the input polarization states since not all PTs can participate efficiently in the fast polarization transformation typically required by a real-time application.

The general purpose of this invention is to remedy the above mentioned shortcomings by making available equipment and a method for driving a polarization compensator that would allow lowering toward zero the probability of a reset condition.

In view of this purpose it was sought to provide in accordance with this invention a method of piloting an optical polarization controller including a cascade of variable polarization transformers that could be driven individually to realize overall a polarization transformation between an input optical signal and an output optical signal with each transformer having predetermined maximum and minimum end driving limits and the method including cyclically for each transformer the following steps:
  a) find an output error signal at the controller representing a signal to be minimized by means of the variable transformer cascade drive,
  b) drive a first variation of the transformer polarization by a predetermined amount CS in one of the two directions, i.e. towards the maximum limit or the minimum limit,
  c) check whether the error signal to be minimized has been reduced and, if not, drive transformer polarization variation by a predetermined amount CS in the other of the two directions;
with the method including for each transformer the additional initial step before step b) of:
  d) decide each time which of the two directions to drive first, toward the maximum limit or toward the minimum limit.

Again in accordance with this invention it was also sought to realize equipment for compensation of the polarization mode dispersion inserted in a fiber connection and including a polarization controller (PC) formed with a certain number of variable polarization transformer stages (PT) driven by a control system as a function of an error variable to be minimized and characterized in that it includes a driving system that checks the stages in accordance with said method.

Figure 2:
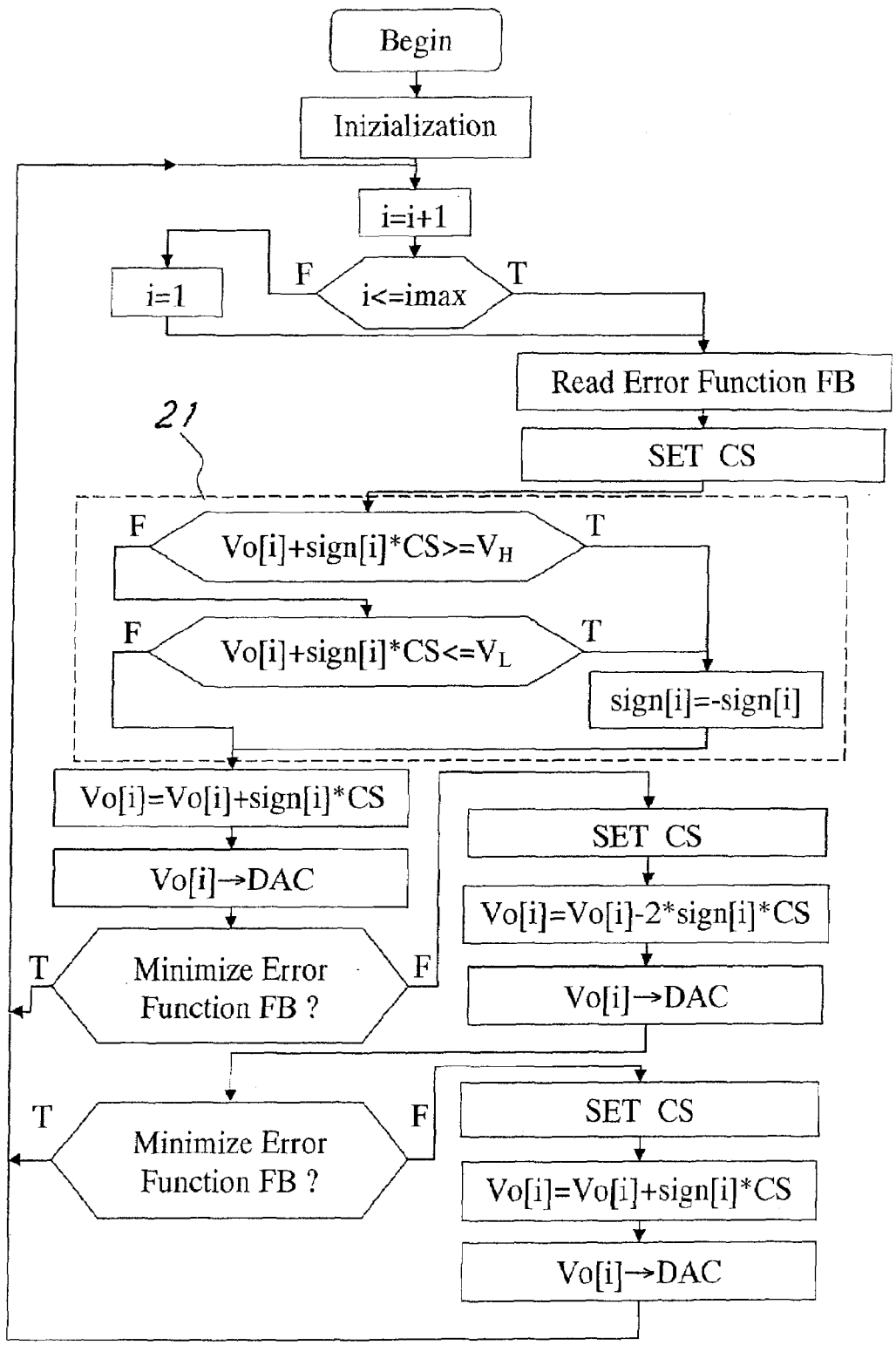

To clarify the explanation of the innovative principles of this invention and its advantages compared with the prior art there is described below with the aid of the annexed drawings a possible embodiment thereof by way of non-limiting example applying said principles. In the drawings:

FIG. 1 shows a block diagram of a polarization compensator realized in accordance with this invention and fitted in a trial optical-fiber transmission system, and FIG. 2 shows a flow chart of the control algorithm of a compensator in accordance with this invention.

With reference to the figures, FIG. 1 shows single-stage polarization mode dispersion compensator equipment inserted in an optical fiber connection suffering from PMD. The compensator is indicated as a whole by reference number 10 and includes a polarization controller (PC) 11 made up of a certain number of variable polarization transformer (PT) stages. Each PT can generate a polarization rotation from 0° to 360°. Such a polarization controller is known and not further described.

As clarified below, in accordance with the principles of this invention it was found advantageous that the compensator have at least six stages. In particular it was found particularly advantageous to use eight stages (PT) to have more degrees of freedom greatly improving the speed of the system.

The purpose of the PC 11 in the application of the example is to rotate the polarization of the modulated optical signal at input 12 in order to generate the optimal polarization state at output 13 that is also used as the optical input of a birefringent fiber 14 that acts as an 'optical equalizer' to mitigate the impairment effect of the signal due to the PMD. The signal output from the fiber 14 is sent to a known receiver 15.

The input signal 12 is affected by the distortions produced by a PMD caused by the fiber connection coming from a known transmitter not shown, for example a digital optical transmitter NRZ.

The receiver 15 known in itself and therefore not further described (for example, a digital optical receiver based on electro-optical photo detectors) makes a check related to the Bit Error Rate (BER). This check is used as a feedback signal (FB) 16 that must be minimized and that is used for piloting the PTs of the PC. In other words, the feedback signal FB is an error function proportionate to the measured BER.

The control algorithm in accordance with this invention is advantageously implemented by means of a microcontroller (μP) 17 appropriately programmed as clarified below. Consequently the microcontroller 17 produces at output drives for appropriately rotating the PTs of the polarization controller. Naturally, the implementation system that rotates the PTs on the basis of the microprocessor drives can be realized in any known manner. For example, as shown in FIG. 1, the microprocessor 17 can drive a group 18 of eight Digital-Analogical Converters (DAC), one for each stage of the controller 11. The group of DACs produces eight Vo[i] (i=1 . . . 8) drive signals that are applied to a known electronic unit 19 that makes the transformation between the drive signals Vo[i] and drives of the rotation means to obtain the desired rotation θ[i] of the eight PTs. In other words, Vo[i] is an eight-element vector representing the control voltage associated with the desired angle for each PT while θ[i] is an eight-element vector with each vector representing the desired rotation angle for each PT (from 0° to 360°).

This structure is basically known in itself and comprehensible to those skilled in the art.

Forgetting the problem of endless tracking in a PC, a conventional PC control method for minimizing the FB can be described in words as follows:

0) set all the eight PTs at their intermediate point (180°),
1) read the FB figure to be minimized,
2) evaluate the correct Control Step (CS) variable for moving the first PT (bigger steps for higher error functions FB for faster convergence,
3) move the first PT with a positive increase on the rotation angle (+CS),
4) read the FB figure to be minimized,
5) if FB decreases, skip to the check of the next PT, and if it increases, move back by −2CS,
6) read the FB figure to be minimized, and
7) if FB decreases, skip to checking of the next PT or if FB increases move forward by +CS (to go to its initial state, which is the best condition at the moment),
8) for all the PTs repeat cyclically forever from step 1 to step 7 to minimize FB.

This way, there is evidence that in the tracking step (i.e. when the FB figure is low enough and the PC must only finely tune its PTs to follow the input polarization variations) the PTs that do not give a considerable contribution to another minimization of the FB are easily piloted (step by step) towards their end limit of 360°.

Indeed, since no 'unwinding' procedure is considered, it was found that in a good convergence condition, when the incremental CS step is small, the redundant PTs that in the algorithm are first incremented by +CS (see step 3) continue to increase their state and can skip to 360° within a few thousand cycles of the control algorithm (this means in a few minutes in a real-time application).

The above-mentioned defect of known systems that lead to an undesired reset condition is at this point evident.

In accordance with the principles of this invention, a decision-maker block of the increase or decrease direction of the PTs that chooses from one cycle to the other the direction of movement to be tested first so as to have an intrinsic 'unwinding' process equally distributed over all the PTs, i.e. performed in the background without influencing the normal operation of the PC and without imposing any constraint on the natural evolution of the convergence process described in the seven above-mentioned steps is added to the control system.

Indeed, if at any one instant of the evolution of the PC the current PT is significant for the convergence process, even if we start in the wrong direction, the algorithm chooses the opposite rotation angle since it is the right one for minimizing FB.

If the current PT is not significant for the convergence process it is automatically kept far from its saturation situation and ready to work as soon as some future input polarization condition needs its contribution.

The choice of direction can be made in various ways. For example, a random choice can be made with equally distributed probability of trying one direction or the other first. It can also be thought to choose alternatively first one direction and then the other.

But it was found particularly advantageous to check the state or the real angle of rotation of the PT that is to be optimized and on the basis thereof select first one increase (+CS) if the state is near 0° or first a decrease (−CS) if the state is near by a predetermined amount to 360° to move away from the saturation condition.

To better understand this invention there is described below with the aid of FIG. 2 a possible algorithm implementing the statistical control method of the PC in accordance with this invention.

To understand the diagram of FIG. 1 some definitions follow:

$V_H$=threshold voltage near $V_{SAT+}$ (i.e. $V_H=V_{SAT+}-V\delta$)
$V_L$=threshold voltage near $V_{SAT-}$ (i.e. $V_L=V_{SAT-}+V\delta$)
$V_{SAT+}$=maximum saturation control voltage (i.e. Vo[i]=$V_{SAT+}$ if θ[i]=360°)
$V_{SAT-}$=minimum saturation control voltage (i.e. Vo[i]=$V_{SAT-}$ if θ[i]=0°)
Vδ=voltage saturation margin (i.e. $(V_{SAT-}+V\delta)<$Vo[i]$<(V_{SAT+}-V\delta)$ is the safe operating condition)
Vmid=intermediate control voltage Vo[i] (i.e. Vmid=$(V_{SAT+}+V_{SAT-})/2$)
sign[i]=array of eight elements of the signs assigned to the increase/decrease step for each PT control (each element is equal to +1 or to −1).

The algorithm begins with an initialization step in which the following variables are set:
imax=8 (number of PT)
i=0
Vo[1]=Vo[2]= . . . =Vo[imax]=Vmid
sign[1]=sign[2]= . . . =sign[imax]=1
CS=variable containing the control step.

Advantageously, CS is calculated as a function of FB so as to have a higher CS in case of a higher error or vice versa so as to have a better control over the polarization compensation.

After initialization, one enters the main loop, that is repeated endlessly. With each repetition cycle of the loop, a following one of the PTs is taken into consideration, thus running them all cyclically from the first to the last. For the sake of convenience defining an index 'i' indicating the PT that is considered in a cycle, as the first step of the loop 'i' is increased by 1. Having reached the imax number of PTs present (eight in the example) 'i' is reset to 1 so as to start over from the beginning.

In the cycle the FB feedback figure representing the error function to be minimized is then read. In accordance with a predetermined function, the increase step CS of the control variable is calculated ('SET CS' block). In general, the higher the FB the larger will be the CS so as to accelerate the convergence process.

Appropriate high and low end thresholds can also be defined in the CS variation.

One then enters a decision-maker block (designated as a whole by reference number 21 of FIG. 2) which decides which variation direction to try first. As a convenient implementation, the decision is expressed as an element sign of the vector sign[i] that will multiply CS in the subsequent operations in the cycle.

In accordance with a preferred embodiment of the decision-maker block, it is checked with two comparisons whether Vo[i]+sign[i]*CS is between $V_L$ and $V_H$, i.e. whether with the increase or decrease of Vo by the amount CS the figure Vo leaves the allowed interval or not (higher or lower). If it leaves the interval, the increase direction is varied to decrease, inverting the sign in the corresponding sign[i] element.

In the next block the variation of Vo is made in the direction decreed by the decision-maker block and the new Vo figure thus obtained is sent to the DACs to drive the $i^{th}$ PT. Then it is verified whether FB decreases.

If the verification is positive, one moves to checking of the next PT while if it is negative (FB increases) the variation of Vo is made in the other direction by 2CSes and it is verified again whether FB decreases. If FB decreases, one moves to checking of the next PT and if FB increases, one moves again in the other direction by a CS amount so as to bring back Vo to its initial value which is the best condition at the moment and one moves to checking of the next PT.

Thus a new approach that can ensure continuing performance in a statistical sense or in the sense that the probability of a reset condition can be lower than 0 is implemented and tested.

This strategy gives better performance in terms of speed of the device since it does not impose just any restriction in the natural evolution of any optimization process involving automatic control of a PC.

On the same optical architecture of a PMD compensator the performance of the method in accordance with this invention with a PC made of eight PTs was compared with the performances of a conventional deterministic algorithm with a PC made of 6 PTs. The differences in convergence and tracking speed of the polarization proved quite substantial. The control in accordance with this invention proved to be the better candidate for development of a PMD compensator while the 6 PTs deterministic version proved to be so slow as to be unable to follow the typical polarization variations of a real fiber connection.

With equipment in accordance with this invention there was no evidence of reset problems in the statistical algorithm used in PMD compensation even with long-term tests (multiple sessions of 36 hours each) with input polarization states varying randomly at estimated maximum speed of a real fiber connection. In the prior art analysis it was found that in the tracking step (i.e., after the initial convergence transients) it was the 'temporarily redundant' angles of the optimization process (i.e. those that being rotated in one direction or the other kept the function to be minimized nearly unvaried) that starting always with a positive increase went to saturation within a few minutes.

Naturally the above description of an embodiment applying the innovative principles of this invention is given by way of non-limiting example of said principles within the scope of the exclusive right claimed here. For example, the angle checking variable in each stage can be different from the voltage. In particular, an angle figure converted at the end by the checking electronics into a rotation voltage of each stage can be used directly. The transformers can also vary from generic minimum angle to a generic maximum rotation angle that would not necessarily be the 0° and 360° given in the example.

The invention claimed is:

1. A method of controlling an optical polarization controller including a plurality of individually driven, variable polarization transformers, the optical polarization controller causing a polarization transformation between an input optical signal and an output optical signal, each transformer having predetermined maximum and minimum end driving limits, comprising, cyclically for each transformer:
    monitoring an output error signal to be minimized the plurality of variable transformers;
    determining a first direction to drive the transformer, between a direction toward a maximum limit and a direction toward a minimum limit;
    driving the transformer by a predetermined amount in a first direction to vary the polarization variation it imparts to the input optical signal;
    determining whether the error signal to be minimized has been reduced; and
    if the error signal to be minimized has not been reduced, driving the transformer by a redetermined amount in a second direction opposite the first direction.

2. The method of claim 1 wherein determining a first direction to drive the transformer comprises, if moving the transformer in one direction would place the transformer within a predetermined threshold of the respective maximum limit or the minimum limit, selecting the opposite direction as the first direction.

3. The method of claim 1 wherein determining a first direction to drive the transformer comprises selecting as the first direction the direction opposite that selected as the first direction in the preceding cycle.

4. The method of claim 1 wherein determining a first direction to drive the transformer comprises selecting the first direction randomly from between the two directions.

5. The method of claim 1 wherein the predetermined amount to drive the transformer is proportional to the error signal.

6. The method of claim 1 wherein the plurality of variable transformers comprises at least six transformers.

7. The method of claim 1 wherein the plurality of variable transformers comprises at least eight transformers.

8. The method of claim 1 wherein the polarization drive value for the $i^{th}$ transformer is calculated as:

$Vo[i]=Vo[i]+\text{sign}[i]*CS$ if $Vo[i]+\text{sign}[i]*CS$ is between $V_L$ and $V_H$, and $Vo[i]=Vo[i]-\text{sign}[i]*CS$ otherwise, where Vo[i] is the polarization drive value of the $i^{th}$ transformer,
$V_H$ is the threshold drive value Vo[i] near the upper saturation figure of a transformer,
$V_L$ is the threshold drive value Vo[i] near the lower saturation figure of a transformer, and sign[i] is +1 or −1 and defines the direction in which the transformer is driven.

9. The method of claim 1 wherein the error signal is the bit error rate (BER) of a receiver downstream of the optical polarization controller.

10. The method of claim 1 wherein each transformer can generate a polarization driven rotation between 0° and 360°.

11. The method of claim 1 wherein, if driving a transformer in both directions does not reduce the error signal to be minimized, the transformer is driven to its initial value.

12. An apparatus inserted in a fiber connection and operative to compensate the polarization mode dispersion of optical signals in the fiber, the apparatus comprising:

a polarization controller (PC) comprising a plurality of individually driven, variable polarization transformer stages (PT);

a control system operative to control the PC in response to an error variable to be minimized; and a driving system in the PC operative to cyclically for each PT stage:

monitor the error variable;

determine a first direction to drive the PT stage, between a direction toward a maximum limit and a direction toward a minimum limit;

drive the PT stage by a predetermined amount in a first direction to vary the polarization variation it imparts to an optical signal;

determine whether the error variable has been reduced; and if the error variable has not been reduced, driving the PT stage by a predetermined amount in a second direction opposite the first direction.

13. The apparatus of claim 12 wherein the error variable is the bit error rate (BER) of a receiver downstream of the PC.

14. The apparatus of claim 12 wherein each PT stage can generate a polarization driven rotation of from 0° to 360°.

15. The apparatus of claim 12 wherein the plurality of variable PT stages comprises at least six PT stages.

16. The apparatus of claim 12 wherein the plurality of variable PT stages comprises at least eight PT stages.

17. The apparatus of 12 characterized further comprising, at the output of the PC, a birefringent fiber that acts as an optical equalizer to mitigate the effect of signal impairment due to the polarization mode dispersion.

* * * * *

UNITED STATES PATENT AND TRADEMARK OFFICE
CERTIFICATE OF CORRECTION

| | | |
|---|---|---|
| PATENT NO. | : 7,920,315 B2 | Page 1 of 1 |
| APPLICATION NO. | : 11/814978 | |
| DATED | : April 5, 2011 | |
| INVENTOR(S) | : Perasso et al. | |

It is certified that error appears in the above-identified patent and that said Letters Patent is hereby corrected as shown below:

In Column 6, Line 34, in Claim 1, delete "redetermined" and insert -- predetermined --, therefor.

Signed and Sealed this
Sixth Day of September, 2011

David J. Kappos
*Director of the United States Patent and Trademark Office*